Jan. 26, 1932.  F. L. PYSHER  1,842,490
AIR BODY TROUT FLY
Filed Aug. 13, 1929
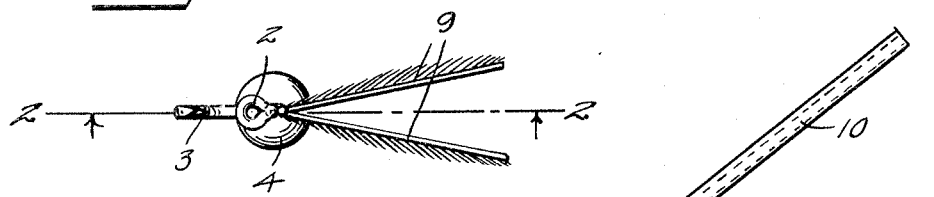
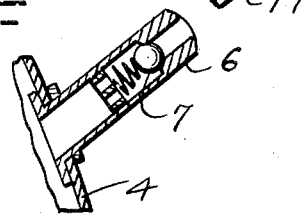
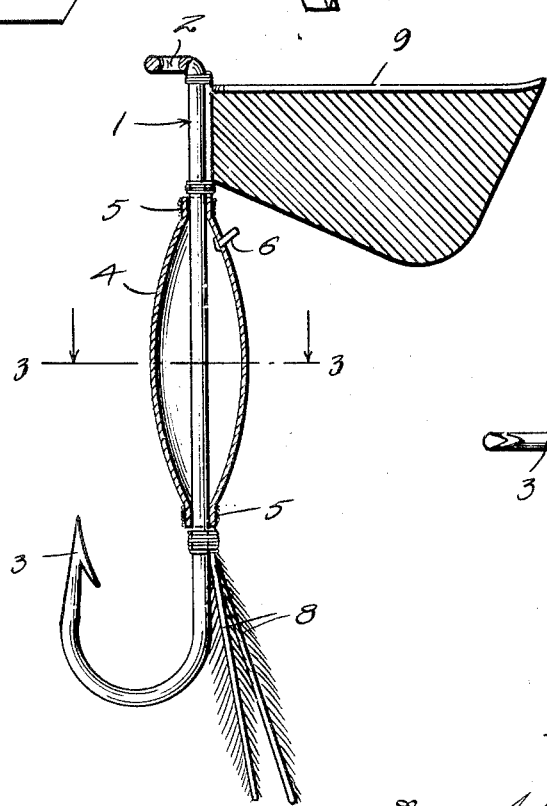
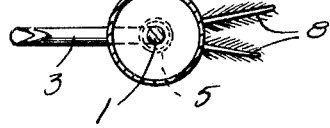
Inventor
F. L. Pysher
By Watson E. Coleman
Attorney Patented Jan. 26, 1932

1,842,490

UNITED STATES PATENT OFFICE

FRED L. PYSHER, OF SPOKANE, WASHINGTON, ASSIGNOR OF TEN PER CENT TO V. L. CARUSO AND FIVE PER CENT TO O. D. LOWTHER, BOTH OF SPOKANE, WASHINGTON

AIR BODY TROUT FLY

Application filed August 13, 1929. Serial No. 385,486.

This invention relates to the class of fishing and trapping and pertains particularly to improvements in trout flies.

The primary object of the present invention is to provide a trout fly having a pneumatic body, which body is in the form of a tight fitting sheath having a valve in the wall thereof by means of which air may be introduced thereinto to enlarge the same as desired.

The invention particularly contemplates the provision of a fishing hook of the usual construction about the shank of which a relatively long sheath of thin rubber is placed, each end of the sheath being gummed and securedly tied about the hook shank so that the air, after being forced thereinto cannot escape and so that water cannot enter. The wall of the sheath at the end nearest the eye of the shank is provided with a valve by means of which air may be introduced into the sheath to enlarge the same and at the hook end space is provided for securing thereto the usual tail feathers and at the opposite end sufficient space is provided for securing wings to the shank.

The invention will be best understood from a consideration of the following detailed description taken in connection with the accompanying drawings forming a part of the present specification with the understanding, however, that the invention is not confined to any strict conformity with the showing of the drawings but may be changed or modified so long as such changes or modifications mark no material departure from the salient features of the invention as expressed in the appended claim.

In the drawings:—

Figure 1 is a view in end elevation of the trout fly embodying the present invention viewing the same from the eye end.

Figure 2 is a longitudinal sectional view of the bait.

Figure 3 is a sectional view taken transversely of the bait upon the line 3—3 of Figure 2.

Figure 4 is an enlarged sectional view through the valve for the air body.

Figure 5 is a side elevational view of the air tube.

Referring more particularly to the drawings, the numeral 1 indicates generally the shank of a fish hook of the usual construction wherein an eye 2 is formed at one end and a barbed hook 3 is formed at the opposite end.

Fitted about the shank of the hook is a relatively long sheath 4 of light rubber, this sheath being of such diameter that when it is deflated it will cling tightly to the shank. The inner face of the sheath at each end is gummed with a suitable water-proof material and the end is then joined securely to the hook shank by silk thread or other suitable material, such as is indicated at 5.

The wall of the sheath 4 at the end adjacent the eye 2 is provided with a relatively short valve tube 6 in which a suitable valve ball 7 is positioned, this ball having sliding movement in the tube to permit introduction of air thereinto but acting, when moved outwardly in the tube, to prevent the escape of air from the sheath.

At the forward or hook end of the hook shank sufficient space is allowed for the attachment to the shank of the tail feathers 8 and between the forward end of the sheath and the eye 2 sufficient space is allowed for attaching the wings 9 to the shank.

In order to facilitate the introduction of air into the sheath 4 there is provided a small metal tube 10, one end of which is tapered, as at 11, to adapt it to the open end of the valve tube 6.

When inflating the body of the fly the reduced or tapered end 11 of the tube is introduced into the valve stem 6 and air then forced through the tube until the body has been expanded to the desired size. Release of the air from the body is effected by introducing the reduced end of the tube into the valve stem to force the ball from its seat, following which action the air will escape readily through the tube, as will be understood.

Having thus described my invention, what I claim is:—

An artificial fishing bait of the character described comprising a hook having an elongated straight shank, an elastic sheath having the shank of the hook extending longitudinally therethrough and secured at each end to the shank, said sheath being of materially less length than the hook shank and having a portion of the shank exposed at each end thereof, valve means in the body of the sheath in close proximity to one end for facilitating the injection of air into the sheath to expand the same, a pair of wings secured to and projecting from the shank of the hook in a direction opposite to and on the shank remote from the point of the hook, said wings joining at the shank and being related to form an acute angle therebetween, and a feather secured to the shank at the end adjacent the hook and upon the side of the shank opposite the same and extending from the shank in the same direction as the wings.

In testimony whereof I hereunto affix my signature.

FRED L. PYSHER.